No. 641,788. Patented Jan. 23, 1900.
W. J. McCLURE, Sr. & W. C. McCLURE.
PLANTER.
(Application filed Sept. 2, 1899.)
(No Model.)
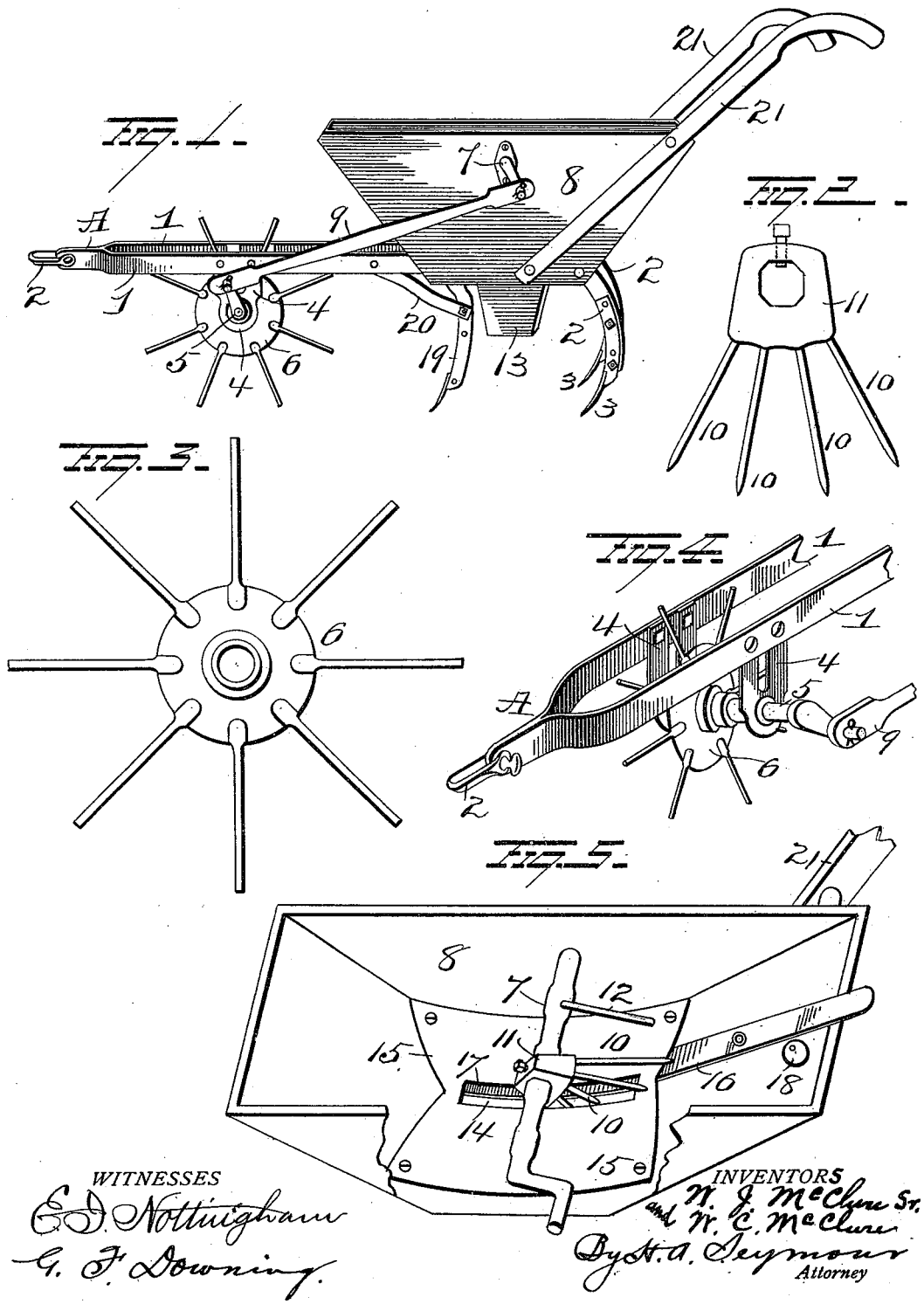
WITNESSES
E. J. Nottingham
G. F. Downing
INVENTORS
W. J. McClure Sr.
and W. C. McClure
By H. A. Seymour
Attorney

UNITED STATES PATENT OFFICE.

WILLIAM J. McCLURE, SR., AND WARREN C. McCLURE, OF SHUQUALAK, MISSISSIPPI.

PLANTER.

SPECIFICATION forming part of Letters Patent No. 641,788, dated January 23, 1900.

Application filed September 2, 1899. Serial No. 729,341. (No model.)

*To all whom it may concern:*

Be it known that we, WILLIAM J. McCLURE, Sr., and WARREN C. McCLURE, residents of Shuqualak, in the county of Noxubee and State of Mississippi, have invented certain new and useful Improvements in Planters; and we do hereby declare the following to be a full, clear, and exact description of the invention, such as will enable others skilled in the art to which it appertains to make and use the same.

Our invention relates to an improvement in cotton-seed planters, one object of the invention being to so construct a planter that it will operate effectually in rough, cloddy, waxy, sticky, or wet or soft soil as well as in loose and dry soil.

A further object is to provide a planter which will be extremely simple in construction, cheap to manufacture, neat in appearance, and most effectual when in operation.

With these objects in view the invention consists in certain novel features of construction and combinations and arrangements of parts, as will be more fully hereinafter described, and pointed out in the claims.

In the accompanying drawings, Figure 1 is a perspective view of our improved planter. Fig. 2 is an enlarged detail view of the feeder. Fig. 3 is an enlarged detail view of the rimless wheel. Fig. 4 is a detached view showing the means for mounting the rimless wheel; and Fig. 5 is an enlarged view, partly in section, showing the seedbox and mechanism therein.

A represents a beam composed, preferably, of metal and comprising two parallel sections 1 1, joined together at their forward ends, as shown, and provided with a suitable clevis 2 for attachment to a draft-animal. The rear ends of the sections 1 1 terminate in downwardly-curved standards 2 2, provided with suitable teeth 3 for covering the seed. The sections 1 1 are provided near their forward ends with downwardly-projecting brackets 4 4, in which a crank-shaft 5 is mounted, and to said shaft a rimless wheel 6 is secured. The wheel 6 is disposed centrally between the brackets 4 4 and projects upward between the sections 1 1, as clearly shown in Fig. 1. The shaft 5 is connected with an oscillating crank-shaft 7, mounted in the seedbox 8, by a pitman 9, so that when the wheel 6 turns it will operate to oscillate the shaft 7 and cause a series of feeder-fingers 10, projecting from a block 11, adjustably connected to the shaft 7, to feed the seed. The shaft 7 also carries an agitator-arm 12, as clearly shown in Fig. 5. The seedbox 8 is supported on the sections 1 1 and is provided with an outlet-spout 13, disposed between said sections, and is made with a longitudinal slot 14 above said spout. A false bottom 15 is disposed in said box 8 and is made, preferably, concave both longitudinally and tranversely to guide the seed to the slot 14, through which the fingers 10 oscillate, and a feed-regulator 16 is disposed between said false bottom and the bottom of the box. The feed-regulator comprises a strip conforming in shape to the contour of the bottom of the box, as shown at 17, Fig. 5. A cam 18 is pivoted to said box and is adapted to be turned by any suitable means (not shown) to move the regulator and adjust the size of the slot, and hence the feed of the seed or grain.

A furrow-opener 19 is connected with the beam A in advance of the box 8 and is provided with suitable braces 20 to securely hold the same in place. Suitable handles 21 are secured on the seedbox 8 to guide the planter.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In a planter, the combination with a beam having furrow-coverers at the rear end, a furrow-opener in advance of said coverers, a crank-shaft mounted in bearings depending from the beam in advance of the furrow-opener, and a rimless wheel secured to said crank-shaft, of a seedbox mounted on the beam between the furrow opener and coverers, said box having a fixed slotted bottom, a false bottom above the fixed bottom and having a slot therein, a valve pivoted to the inner face of the box and projecting into the space between the two bottoms so as to regulate the width of the slots therein, a crank-shaft mounted in the box, fingers projecting from said shaft and arranged to project through the slots in said bottoms, and a pitman connecting the crank-shaft in the box with the crank-shaft to which the rimless wheel is secured.

2. In a planter, the combination with a beam comprising two parallel members connected together at their forward ends, the rear end of each of said members bent downwardly to form rigid standards, a tooth secured to the lower end of each standard, a standard disposed between the parallel members of the beam in advance of the parallel standards and provided at its lower end with a tooth, a seed-box supported upon the parallel members of the beam and having a spout depending between the parallel standards and said forward standard, a slotted bottom in said seedbox, a false bottom in the seedbox and having an elongated slot therein, a valve projecting between said bottom and false bottom, a crank-shaft mounted in the seedbox, arms on said shaft adapted to project through the slots in said bottoms, a crank-shaft mounted in bearings depending from the members of the beam in advance of the seedbox, a rimless wheel secured to said shaft, and a pitman connecting said crank-shafts.

In testimony whereof we have signed this specification in the presence of two subscribing witnesses.

WILLIAM J. McCLURE, Sr.
WARREN C. McCLURE.

Witnesses:
W. CLEARMAN,
R. C. COMBS.